(12) United States Patent
Stöven et al.

(10) Patent No.: US 11,597,163 B2
(45) Date of Patent: Mar. 7, 2023

(54) METHOD FOR CONNECTING TWO COMPONENTS MADE OF A THERMOPLASTIC MATERIAL

(71) Applicant: Airbus Operations GmbH, Hamburg (DE)

(72) Inventors: Timo Stöven, Bremen (DE); Filipp Köhler, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/531,135

(22) Filed: Nov. 19, 2021

(65) Prior Publication Data

US 2022/0072805 A1    Mar. 10, 2022

Related U.S. Application Data

(63) Continuation of application No. PCT/EP2020/070328, filed on Jul. 17, 2020.

(30) Foreign Application Priority Data

Jul. 30, 2019  (DE) .................... 10 2019 120 591.3

(51) Int. Cl.
*B29C 65/08* (2006.01)
*B29C 65/00* (2006.01)
*B29L 31/30* (2006.01)

(52) U.S. Cl.
CPC .......... *B29C 66/0224* (2013.01); *B29C 65/08* (2013.01); *B29C 66/721* (2013.01); *B29C 66/7392* (2013.01); *B29L 2031/3076* (2013.01)

(58) Field of Classification Search
CPC ... B29C 65/08; B29C 66/0224; B29C 66/721; B29C 66/7392; B29L 2031/3076
USPC ........................................................ 156/73.1
See application file for complete search history.

(56) References Cited

U.S. PATENT DOCUMENTS

| 5,418,035 A | 5/1995 | Iguchi et al. |
| 5,789,061 A * | 8/1998 | Campbell ......... B29C 66/43441 156/92 |
| 2019/0293048 A1* | 9/2019 | Roberts ............... B29C 65/1425 |

FOREIGN PATENT DOCUMENTS

| JP | S5916495 A | 1/1984 |
| WO | WO 2019190958 A1 | 10/2019 |

OTHER PUBLICATIONS

International Preliminary Report on Patentability for Application No. PCT/EP2020/070328 dated Jul. 7, 2020.
(Continued)

*Primary Examiner* — James D Sells
(74) *Attorney, Agent, or Firm* — Jenkins, Wilson, Taylor & Hunt, P.A.

(57) ABSTRACT

A method for connecting two components. In this method, a first component and a second component, which are each formed from a thermoplastic material, are first provided. The first component has a first peel-off ply on a first surface of the first component. The first peel-off ply is removed from the first component. Once the first peel-off ply has been removed, the first surface of the first component is brought into contact with a second surface of the second component. The first component and the second component are then welded to one another at the first and second surface by ultrasonic welding.

14 Claims, 3 Drawing Sheets

(56) References Cited

OTHER PUBLICATIONS

German Search Report for Application No. 10201920591 dated Dec. 12, 2019.
International Search Report and Written Opinion for Application No. PCT/EP2020/070328 dated Sep. 30, 2020.

* cited by examiner

METHOD FOR CONNECTING TWO COMPONENTS MADE OF A THERMOPLASTIC MATERIAL

CROSS-REFERENCE TO RELATED APPLICATIONS

This application is a continuation of and claims priority to PCT/EP2020/070328 filed Jul. 17, 2020, which claims priority to German Patent Application No. 10 2019 120 591.3 filed Jul. 30, 2019, the entire disclosures of which are incorporated by reference herein.

TECHNICAL FIELD

The subject matter herein relates to a method for joining two components made of a thermoplastic polymer material, wherein the two components are contacted with one another and subsequently welded to one another by ultrasonic welding.

BACKGROUND

Thermoplastic polymer materials are employed, in fiber-reinforced form and non-fiber-reinforced form, in numerous areas of technology and applications, such as, for example, in the aerospace and automotive industries. By virtue of the thermoplastic properties, different structural parts or components produced from such polymer materials can be welded to one another to produce larger constructions and structures.

One known welding method is ultrasonic welding, which, however, is used primarily for non-fiber-reinforced polymer materials having low or moderate melting temperatures of not more than 200° C. Conversely, it has emerged as being difficult to employ ultrasonic welding on an industrial scale for components made of fiber-reinforced polymer materials, and more particularly of fiber-reinforced high-performance polymer materials, such as PPS, PEI, PEEK or PEKK, for instance. To address this difficulty, attempts have been made to optimize the geometry, operating frequency, amplitude and other parameters of the ultrasonic sonotrode and process parameters, such as application pressure, component geometry and processing time, for instance. A significant improvement in the quality of the welded join has been achieved, however, merely by placing elements known as energy directors between the components that are to be welded. A disadvantage of these energy directors, however, is that separate elements must be placed in a defined way between the two components prior to their ultrasonic welding. This gives rise to an increase in labor effort, in processing time and in costs, and the flexibility in the design of the combination of the two components joined to one another is limited.

SUMMARY

It is an object of the disclosure herein, therefore, to provide a method for joining two components made of a thermoplastic polymer material by ultrasonic welding, the method being simple, inexpensive and flexible in its implementation and permitting further improvement in the quality of the welded join, particularly in the case of fiber-reinforced high-performance polymer materials.

This object is fulfilled by a method and by a use of a component made of a thermoplastic polymer material as disclosed herein. Advantageous embodiments of the method are disclosed herein.

Provided in accordance with the disclosure herein is a method for joining two components, wherein a first component and a second component are provided, each being formed of a thermoplastic polymer material. After the providing and before the joining of the two components, therefore, the thermoplastic polymer material is in consolidated form. Each of the two components here is preferably formed entirely of the thermoplastic polymer material, or consists thereof. It is, however, also possible for one or both of the two components to be only a part or a section of a larger component, which as well as the part or section made from the thermoplastic polymer material also has further parts or sections made from one or more other materials. A relatively large component of this kind may in that case also have still further parts or sections formed of the same or of a different thermoplastic polymer materials.

In each case the first component has a first peel ply on a first surface of the first component. The first surface here may be the entire surface of the first component on one side of the first component, or only a part or section of such a surface, such as, in particular, the part or section which is welded to the second component. A peel ply, conventionally, is a fabric which may be formed, for example, of textile fibers or filaments, such as, for example, glass fibers or glass filaments or ceramic fibers or ceramic filaments, which may be employed advantageously particularly in the case of high-performance thermoplastics, or else of nylon or polyamide fibers or filaments, and which, during production, prior to the consolidation, is placed as a layer on the surface of a polymeric component and can be removed after the solidification of the polymeric material. In the case of components which are produced as laminates and more particularly as fiber-reinforced polymer laminates, the peel plies are introduced into the laminate during production as a first or last layer. The removal or peeling of the peel ply provides the surface in question with a uniformly rough surface, which enables adhesive bonding or surface coating without cleaning or abrading. The peel ply is preferably a woven textile structure, but may also optionally be a non-woven sheetlike fiber structure, made from the fiber materials stated above, for example.

Accordingly, after the provision of the first component, the first peel ply is removed or peeled from the first component. After the removal of the first peel ply, the first surface of the first component is contacted with a second surface of the second component. In other words, the first and second components are placed one against the other by their first and second surfaces, and are pressed against one another preferably with a defined application pressure. The first and second surfaces are therefore in direct contact, and there are preferably no further material and no further elements placed between the first and second surfaces, more particularly no adhesive material and no separate energy directors.

The first component and the second component are subsequently welded to one another on the first and second surfaces by ultrasonic welding, in other words while they are in contact with one another. The removal of the peel ply from the first surface advantageously forms, in the surface, a surface profile which, extensively, comprises an arrangement of a multiplicity of—preferably entirely or at least sectionally uniformly distributed and identical—elevations and depressions, or projections spaced apart from one another. The latter, by virtue of being formed by the threads or filaments of the peel ply, may advantageously be fine structures, which can be simply produced and at the same time—through choice of a suitable peel ply—adapted flexibly in shape, dimensions and arrangement. It has surprisingly emerged that the elevations or projections spaced apart from one another act as a multiplicity of finely distributed energy directors. During the ultrasonic welding, they are in contact with the second surface and they steer the ultrasonic energy into the contact region between the first and second surfaces by acting as a multiplicity of finely distributed ultrasound nuclei and ensuring more uniform dissipation of the ultrasonic energy. These elevations/projections preferably have "peaks" and may be provided, for example, pyramidally or in the form of elongated mountain ridges.

In this way, advantageously, an ultrasonically welded join of improved quality is produced, and the method is nevertheless particularly simple, inexpensive and flexible to implement. In particular there is no need to place separate layers or elements as energy directors between the two components to be welded, or to form such energy directors in a separate step on the first surface of the first component.

In a preferred embodiment the first component and the second component are each a part of an aircraft. In that case, more particularly, the first component and the second component may each be a section of a fuselage, of a wing, of a tail assembly or of a control surface of the aircraft. For example, one of the first and second components may be a stiffening element, such as a rib or a stringer, for example, and the other of the first and second components may be an outer skin or a further stiffening element, such as a stringer or a rib, for example. By the method, components made of fiber-reinforced and non-fiber-reinforced plastics may also be joined to one another to form an ultrasonically welded join of high quality, of the kind employed in the aerospace industry and in aircraft construction.

In a preferred embodiment the peel ply is configured such that the removal of the peel ply from the first surface forms therein, in the manner described above, a surface profile which comprises an arrangement of a multiplicity of elevations and depressions, or projections spaced apart from one another, having dimensions in the submillimeter range, in other words dimensions of less than 1 mm. These dimensions in the submillimeter range are present in one or two—in that case preferably perpendicular to one another—dimensions along the first surface and preferably also in the dimension perpendicular to the first surface. As a result, the elevations/projections are fine and have a distance from one another of less than 1 mm, thereby achieving particularly uniform dissipation of the ultrasonic energy. In this context it is also possible, for example, for the peel ply to have a configuration or to be configured in such a way that the dimensions described are less than 0.9 mm, less than 0.8 mm, less than 0.7 mm, less than 0.6 mm or less than 0.5 mm.

In a preferred embodiment the thermoplastic polymer material of the first component and/or of the second component has a melting temperature of more than 200° C. and, for example, of at least 220° C. In the case of a fiber-reinforced polymer material, this melting temperature is valid, in a customary way, for the thermoplastic matrix material.

In a preferred embodiment the thermoplastic polymer material of the first component and/or of the second component in each case comprises a high-performance thermoplastic or high-temperature-resistant thermoplastic polymer or is such a material. For example, the thermoplastic polymer material of the first component and/or of the second component may in that case comprise or be PPS, PEI, PEEK and/or PEKK. This is preferably so both for the first component and for the second component; in other words, in the case of the stated specific thermoplastic polymers, the thermoplastic polymer material both of the first component and of the second component comprises in each case PPS, PEI, PEEK and/or PEKK or preferably is PPS, PEI, PEEK and/or PEKK.

In a preferred embodiment the thermoplastic polymer material is in each case a fiber-reinforced polymer material, i.e. a fiber composite material or fiber composite. In this embodiment, accordingly, the respective component is a fiber composite component. In that case the fibers belong to the thermoplastic polymer material, even if they are not themselves formed of a thermoplastic polymer material. This is preferably the case for both components; in other words, the thermoplastic polymer material both of the first component and of the second component is in each case then a fiber-reinforced polymer material. The fibers here may be, for example, carbon fibers, glass fibers or aramid fibers, and use may be made of continuous fibers, long fibers or short fibers.

In a preferred embodiment the provision of the first component comprises producing the first component with the first peel ply on the first surface of the first component. Alternatively, the first component may be selected from a multiplicity of components with a peel ply that have already been produced. If the provision of the first component comprises producing the first component with the first peel ply on the first surface, it is further preferred for the peel ply to be formed of a multiplicity of threads or filaments and, in the production of the first component with the peel ply, for one or more values for one or more parameters to be selected from the group consisting of filament spacing, filament diameter, filament shape and mesh size. Then, in the production of the first component, the peel ply subsequently selected or produced is a peel ply which has the selected parameter value or the selected parameter values. The energy directors formed by the elevations or projections can accordingly be adapted in a very simple and flexible way to the respective use and the materials used therein and to the specific target strength of the welded join, by specific selection of a peel ply having corresponding properties.

In a preferred embodiment the second component has a second peel ply on the second surface of the second component, and the process further comprises the step, before the contacting of the first surface of the first component with the second surface of the second component, of removing or peeling the second peel ply from the second component. As regards the configuration of the second peel ply and the surface profile formed on the second surface by removal of the ply, the associated explanation is the same as given for the first peel ply and for the surface profile formed on the first surface by the removal of the ply. The provision of the second component may then preferably comprise producing the second component with the second peel ply on the second surface of the second component.

The disclosure herein further provides for the use of a component formed of a thermoplastic polymer material and produced with a peel ply on one surface of the component as a first component or second component according to any of the embodiments described above. In that case the peel ply of the component is the first or second peel ply, respectively, and the surface of the component with the peel ply is the first or second surface, respectively.

BRIEF DESCRIPTION OF THE DRAWINGS

The disclosure herein is elucidated in more detail below with reference to the figures, which show an example embodiment.

DETAILED DESCRIPTION

Figure 1:
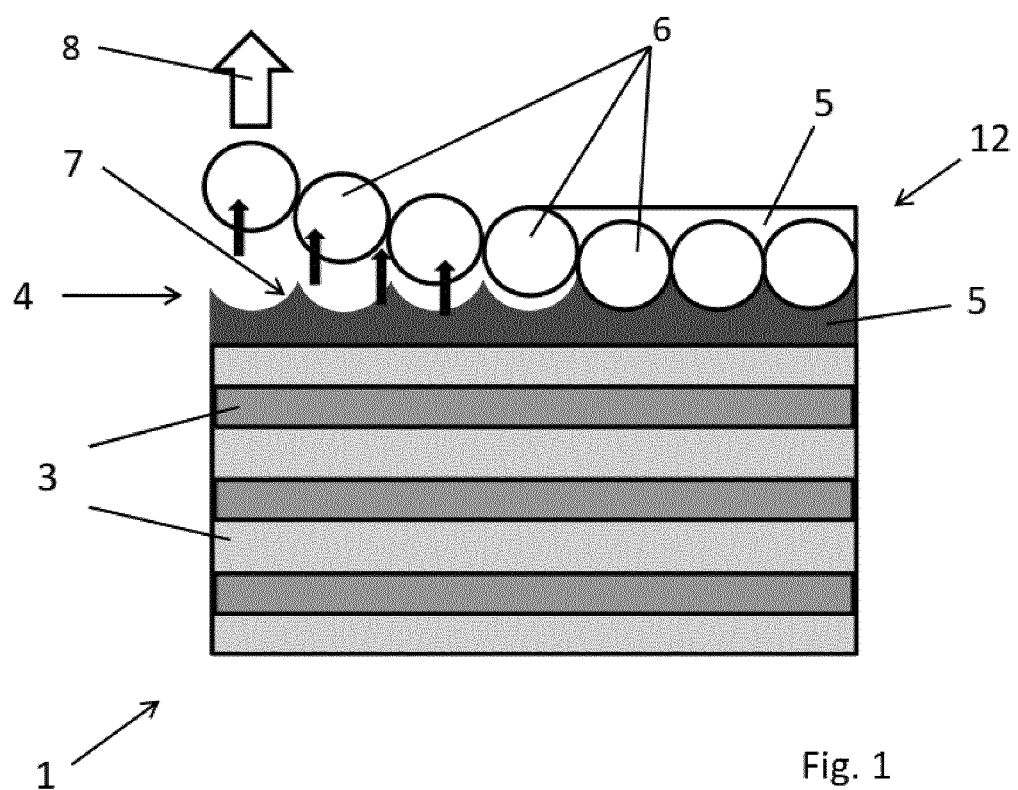
FIG. 1 shows the provision of a first component made of fiber-reinforced polymer material with a peel ply according to an example embodiment of the disclosure herein.

FIG. 1 shows a first component 1, which is formed of fiber-reinforced thermoplastic polymer material. It is provided in the form of a laminate composed of a multiplicity of mutually superposed layers 3 each made of a fiber-reinforced polymer material. For clarity, only two of the layers 3 have been given the reference symbol. Different layers may be formed of the same fiber-reinforced polymer material or of different fiber-reinforced polymer materials. For example, layers 3 made of two different fiber-reinforced polymer materials may alternate along the stacked direction. In a surface layer 4 the first component 1 has a peel ply 6 which is embedded in a matrix 5 made of a thermoplastic polymer material. The peel ply 6 is therefore disposed on a first surface 12 of the first component 1.

The first component 1 is provided in a first method step by being selected, for example, from a multiplicity of components in the elucidated configuration that have already been produced, or by producing it by building up the laminate.

Figure 2:
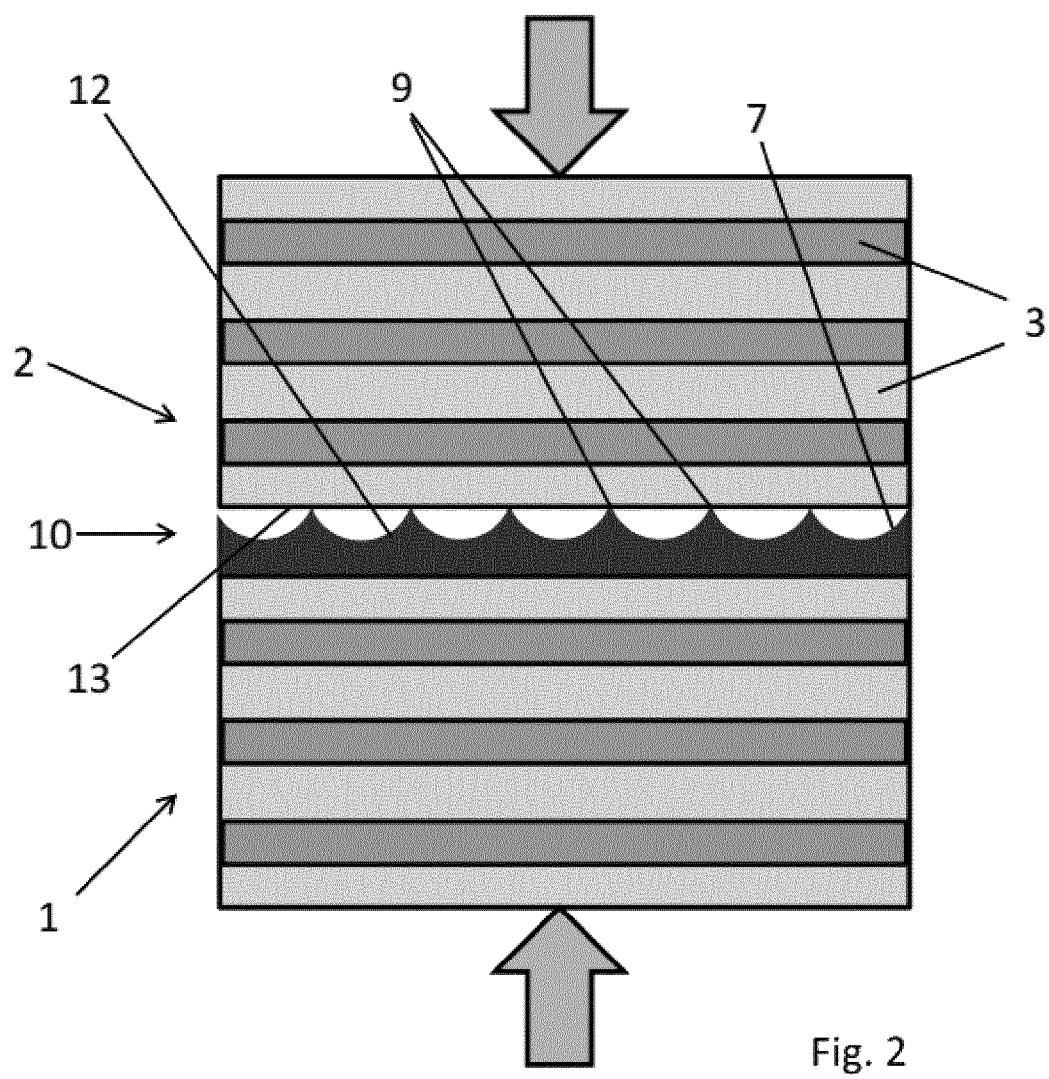
FIG. 2 shows the first component of FIG. 1 after the removal of the peel ply and after the subsequent contacting with a second component made of fiber-reinforced polymer material.
Figure 3:
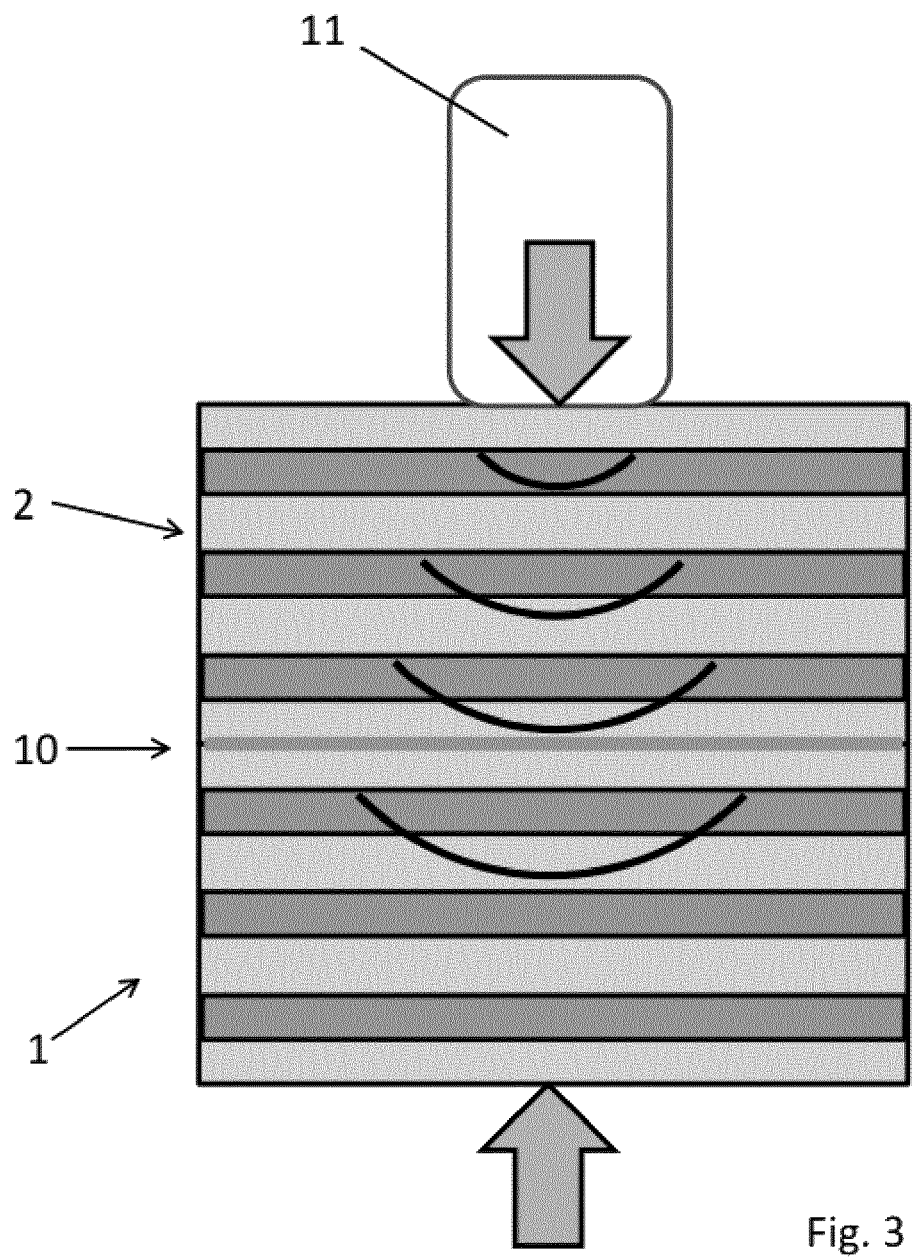
FIG. 3 shows the first and second components of FIG. 2 after ultrasonic welding by an ultrasonic sonotrode.

The peel ply 6 is subsequently removed from the first component 1 by exertion of a peeling force 8, thereby producing in the first surface 12 a surface profile 7 which comprises a multiplicity of peaked projections 9 spaced apart from one another (see also FIG. 2). As can be seen from FIG. 1, the shape, the dimensions and the arrangement of the projections 9 are determined by the shape, the dimensions and the spacings of the threads or filaments of the peel ply 6.

Following the removal of the peel ply 6, the first component 1 is contacted by its first surface 12, or more exactly the projections 9, with a second surface 13 of a second component 2, which—except for the absence of the peel ply 6—is structured in the same way as the first component 1 shown in FIG. 1 and has been provided beforehand. The first component 1 and the second component 2, in the mutually contacted state, are shown in FIG. 2. The contact region between the two components 1, 2 is indicated by the reference symbol 10. The first component 1 and the second component 2 are pressed against one another by exertion of forces which are indicated by the arrows.

An ultrasonic sonotrode 11 is subsequently contacted with, for example, the second component 2. When ultrasonic energy is then introduced from the ultrasonic sonotrode 11 into the combination of first and second 1, 2, the projections 9 act as energy directors and nuclei for the uniform dissipation of the ultrasonic energy, and so the thermoplastic matrix material in the contact region 10 is uniformly melted and welded to one another.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for joining two components, comprising:
providing a first component and a second component, which are each formed of a thermoplastic polymer material, the first component having a first peel ply on a first surface of the first component;
removing the first peel ply from the first component to form a surface profile in the first surface which comprises an arrangement of a multiplicity of elevations and depressions;
after removing the first peel ply, contacting the first surface of the first component with a second surface of the second component; and
subsequently welding the first component and the second component to one another on the first and second surfaces by ultrasonic welding;
wherein the multiplicity of elevations and depressions are configured to steer ultrasonic energy produced by the ultrasonic welding into a contact region between the first surface and the second surface.

2. The method of claim 1, wherein the first and second components are each a part of an aircraft.

3. The method of claim 2, wherein the first and second components are each a section of a fuselage, of a wing, of a tail assembly or of a control surface of the aircraft.

4. The method of claim 2, wherein one of the first and second components is a stiffening element and another of the first and second components is an outer skin or a further stiffening element.

5. The method of claim 1, wherein the peel ply is configured such that the arrangement of a multiplicity of elevations and depressions have dimensions in a submillimeter range.

6. The method of claim 1, wherein the thermoplastic polymer material of the first component and/or of the second component has a melting temperature of more than 200° C.

7. The method of claim 1, wherein the thermoplastic polymer material of the first component and/or of the second component comprises PPS, PEI, PEEK and/or PEKK.

8. The method of claim 1, wherein the thermoplastic polymer material is in each case a fiber-reinforced polymer material.

9. The method of claim 1, wherein providing the first component comprises producing the first component with the first peel ply on the first surface of the first component.

10. A method for joining two components, comprising:
providing a first component and a second component, which are each formed of a thermoplastic polymer material, wherein providing the first component comprises producing the first component with a first peel ply on a first surface of the first component;
removing the first peel ply from the first component;
after removing the first peel ply, contacting the first surface of the first component with a second surface of the second component; and
subsequently welding the first component and the second component to one another on the first and second surfaces by ultrasonic welding;

wherein the peel ply is formed of a multiplicity of filaments and wherein producing the first component with the peel ply comprises selecting at least one value for at least one parameter from the group consisting of filament spacing, filament diameter, filament shape and mesh size, and selecting or producing as the peel ply a peel ply which has the selected parameter value.

11. The method of claim 1, wherein the second component comprises a second peel ply on the second surface of the second component and wherein, further, before the contacting of the first surface of the first component with the second surface of the second component, removing the second peel ply from the second component.

12. The method of claim 11, wherein providing the second component comprises producing the second component with the second peel ply on the second surface of the second component.

13. The use of a component which is formed of a thermoplastic polymer material and which is produced with a peel ply on a surface of the component as first component or second component as set forth in claim 1.

14. The method of claim 1, wherein the peel ply is configured such that the multiplicity of elevations and depressions are configured such that the ultrasonic welding produces a joint between the first component and the second component having a target strength.

\* \* \* \* \*